United States Patent
Benbouhout et al.

(10) Patent No.: US 10,564,254 B2
(45) Date of Patent: Feb. 18, 2020

(54) METHOD USING ULTRA HIGH FREQUENCY WAVES FOR LOCATING A PORTABLE DEVICE GIVING "HANDS FREE" ACCESS TO A VEHICLE, ASSOCIATED LOCATING DEVICE AND PORTABLE DEVICE

(71) Applicants: CONTINENTAL AUTOMOTIVE FRANCE, Toulouse (FR); CONTINENTAL AUTOMOTIVE GmbH, Hannover (DE)

(72) Inventors: Rachid Benbouhout, Cugnaux (FR); Sylvain Godet, Saint-Cezert (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 361 days.

(21) Appl. No.: 15/496,028

(22) Filed: Apr. 25, 2017

(65) Prior Publication Data
US 2017/0322287 A1  Nov. 9, 2017

(30) Foreign Application Priority Data
May 4, 2016  (FR) .................... 16 54029

(51) Int. Cl.
G01S 5/26  (2006.01)
B60R 25/24  (2013.01)
H04B 11/00  (2006.01)

(52) U.S. Cl.
CPC ............. G01S 5/26 (2013.01); B60R 25/24 (2013.01); H04B 11/00 (2013.01); B60R 2325/10 (2013.01); B60R 2325/205 (2013.01)

(58) Field of Classification Search
CPC ... G01S 5/26; G01S 11/16; G01S 5/30; B60R 25/24; B60R 2325/205; B60R 2325/10;
(Continued)

(56) References Cited

U.S. PATENT DOCUMENTS

| 7,724,610 | B2 * | 5/2010 | Supino | G01C 21/00 367/118 |
| 8,078,401 | B2 * | 12/2011 | Supino | G01C 21/16 701/300 |

(Continued)

FOREIGN PATENT DOCUMENTS

| CN | 107422306 A | * 12/2017 | ............ B60R 25/24 |
| DE | 10 2009 014975 A1 | 9/2010 | |

(Continued)

OTHER PUBLICATIONS

FR Search Report, dated Dec. 16, 2016, from corresponding FR application.

*Primary Examiner* — Daniel Pihulic
(74) *Attorney, Agent, or Firm* — Young & Thompson

(57) ABSTRACT

Disclosed is a method for locating a portable device giving "hands free" access to a vehicle, by a location device intended to be installed in the vehicle, the portable device communicating with the location device by ultra high frequency waves, the invention consisting at each transmission of an ultra high frequency signal by the location device: of simultaneously transmitting by the location device at least one ultrasonic signal, intended for the portable device; of measuring a delay between a first time of reception of the ultra high frequency signal and un second time of reception of the ultrasonic signal by the portable device; of determining a distance between the portable device and the location device on the basis of the delay thus measured. Also disclosed is a location device and a corresponding portable device.

9 Claims, 3 Drawing Sheets

(58) Field of Classification Search
CPC .......... H04B 11/00; G07C 2209/63; G07C 2009/00769; G07C 9/00309
See application file for complete search history.

(56) References Cited

U.S. PATENT DOCUMENTS

| | | | |
|---|---|---|---|
| 2007/0115137 A1 | 5/2007 | Lyon et al. | |
| 2009/0073045 A1* | 3/2009 | Supino | G01C 21/00 |
| | | | 342/463 |
| 2009/0326795 A1* | 12/2009 | Supino | G01C 21/16 |
| | | | 702/94 |
| 2012/0059583 A1* | 3/2012 | Supino | G01C 21/16 |
| | | | 701/512 |
| 2015/0277428 A1* | 10/2015 | Dackefjord | G07C 3/04 |
| | | | 700/180 |
| 2017/0322287 A1* | 11/2017 | Benbouhout | B60R 25/24 |

FOREIGN PATENT DOCUMENTS

| | | | | |
|---|---|---|---|---|
| EP | 0 990 757 A2 | 4/2000 | | |
| EP | 2 821 807 A2 | 1/2015 | | |
| FR | 2 986 686 A1 | 8/2013 | | |
| FR | 3051047 A1 * | 11/2017 | .......... | B60R 25/24 |
| KR | 20170125739 A * | 11/2017 | .......... | B60R 25/24 |

\* cited by examiner

METHOD USING ULTRA HIGH FREQUENCY WAVES FOR LOCATING A PORTABLE DEVICE GIVING "HANDS FREE" ACCESS TO A VEHICLE, ASSOCIATED LOCATING DEVICE AND PORTABLE DEVICE

FIELD OF THE INVENTION

The invention relates to a method using ultra high frequency waves for locating a portable device giving "hands free" access to or starting of a motor vehicle as well as a locating device installed in the vehicle and the associated portable device.

BACKGROUND OF THE INVENTION

The invention applies more particularly to systems giving "hands free" access to and/or starting of motor vehicles. A so-called "hands free" system for access to a motor vehicle makes it possible for an authorized user to lock and/or unlock the openings of his vehicle and/or to start the vehicle without using a key. In order to do this, the vehicle proceeds with the identification of a portable device such as a badge or a remote control carried by the user and if the badge or the remote control is situated in a predetermined zone around the vehicle and is identified as belonging to the vehicle, then the vehicle automatically locks/unlocks its openings or starts according to the user's intention, without the user having to use a key.

This "hands free" access system is known to those skilled in the art. It is generally composed of an electronic control unit installed in the vehicle, one or more radiofrequency (RF) antennas situated on the vehicle and an identification badge or remote control comprising an RF antenna carried by the user.

An identifier exchange between the portable device and the vehicle by the intermediary of the RF antennas and the electronic control unit allows the identification of the portable device by the vehicle and the triggering of the locking or unlocking of the openings or the starting by the latter.

The identifier can be contained in a portable device other than a badge or a remote control, for example it can be contained in a mobile telephone or "smartphone" in English ("telephone intelligent" in French), or in a watch worn by the user.

The identifier exchange is generally carried out by Radio Frequency (RF) waves and by Low Frequency (or LF, standing for "Low frequency" in English) waves. The vehicle firstly transmits, by the intermediary of the LF antennas, an LF interrogation signal and the portable device, if it is situated in the reception zone of the said signal (i.e. a predetermined zone around the vehicle), returns an RF presence message to the vehicle containing its identifier.

The precise location of the portable device around the vehicle is carried out by a measurement of the strength of the LF signal received by the portable device (via the antennas and the electronic control unit) coming from the vehicle, more commonly called RSSI ("Received Signal Strength Indication" in English, or measurement of the received power of a signal received by an antenna) measurements. The measurement of the strength of the signal received by the portable device coming from each LF antenna, is received and analyzed by a location device installed in the vehicle, which thus determines the position of the portable device with respect to the said LF antennas, that is to say with respect to the vehicle.

The location device D generally comprises the electronic control unit 10 and three to four antennas A1, A2, A3, A4 and is shown in FIG. 1.

FIG. 1 shows three location zones of the portable device P around the vehicle V, a first zone Z1 covering the interior of the passenger compartment of the vehicle, a second zone Z2 covering the first zone Z1 and a zone which is external but close to the vehicle, and a third zone Z3, covering the first and second zones Z1, Z2 and an enlarged external zone around the vehicle V.

According to the location of the portable device P identified by the vehicle, in the said location zones Z1, Z2, Z3, certain actions specific to the said location zones are carried out automatically: starting the vehicle, unlocking/locking or prior switching on the passenger compartment lighting (also called "welcome lighting" in English).

The RSSI measurement makes it possible to locate precisely the portable device P in the location zones, that is to say around and inside the vehicle V in order to allow not only the locking/unlocking of the openings but also the starting of the vehicle V, when the portable device P is detected in the interior of the vehicle V.

In the case where the portable device is a mobile telephone, the communication with the vehicle in RF (for example in the ISM bands) and LF (for example at 125 kHz) is not always possible, because most mobile telephones do not have RF or LF communication means whose frequencies are compatible with those used during the communication with a vehicle, such as the frequencies of 315 MHz and 433.92 MHz for the RF and 125 kHz for the LF.

On the other hand, as of this moment, mobile telephones have the Bluetooth® or Bluetooth Low Energy (BLE) communication standard, that is to say communication at Ultra High Frequency (UHF) from 2400 MHz to 2480 MHz. This communication standard has the advantage of being universal and therefore does not necessitate approval specific to each country (only an international "Bluetooth Low Energy" certification), as is the case with the current RF and LF communication standards whose operating frequencies differ depending on the country.

It therefore becomes necessary to adapt the "hands free" vehicle access and/or starting system so that it can also operate with a mobile telephone equipped with the Bluetooth® communication standard and no longer solely by the intermediary of radio and low frequency (RF, LF) waves.

The advantage of the Bluetooth® communication standard is that it allows a long communication range of about 250 m around the vehicle. However, it does not make it possible to detect precisely the presence of the portable device at shorter distances. For example, when the portable device P is about ten centimeters from the vehicle V and the user wishes to unlock his vehicle, the precise location of the portable device which was possible with the communication device of the prior art, operating with an exchange by RF and LF waves, is no longer possible by Bluetooth®. In fact, the RSSI measurement of a Bluetooth signal is very imprecise and varies enormously as a function of the environment (noise, interference) and it is not possible to know if the portable device, whose position is fixed, is 5 m or 10 m or 40 m or more from the vehicle.

It is therefore no longer possible to start the vehicle by using Bluetooth®, communication since the starting must be authorized only when the portable device is inside of the vehicle and a few centimeters from the UHF antennas of the vehicle. Given the great variation of the RSSI of Bluetooth®, the detection of the said portable device a few centimeters from the UHF antennas is not possible.

Now, Bluetooth® communication is a communication protocol which is optimized with respect to interference, since it is carried out sequentially on several different frequency channels (also called "multi-channel" communication), generally on three channels, in order to be as little sensitive as possible to external interference, for example to interference coming from a Wifi™ communication (wireless communication).

Bluetooth® communication in fact consists of the successive transmission of data on three separate frequency channels, for example: 2.402 GHz, then 2.426 GHz, and finally on 2.480 GHz. By multiplying the transmission channels, the probability of interference on the three frequencies at the same time is low, and the communication with the portable device is therefore ensured at least on one frequency. However, the precise location of the said portable device remains impossible.

The invention proposes a device for the ultra high frequency location of the portable device making it possible to overcome these disadvantages.

In this case, the invention proposes a method using ultra high frequency waves for locating a portable device for giving "hands free" access to and/or starting of a motor vehicle making it possible to locate precisely the portable device inside and outside of the vehicle, in order to be able to initiate appropriate actions such as for example the automatic unlocking/locking of the doors and the starting of the vehicle.

SUMMARY OF THE INVENTION

The invention proposes a method for locating a portable device for giving "hands free" access to a vehicle by a location device intended to the installed in the vehicle, the said portable device communicating with the said location device by ultra high frequency waves, the said method being noteworthy in that it consists at every transmission of an ultra high frequency signal by the location device:
  of simultaneously transmitting by the location device at least one ultrasonic signal intended for the portable device,
  of measuring a delay between a first time of reception of the ultra high frequency signal and a second time of reception of the ultrasonic signal by the portable device,
  of determining a distance between the portable device and the location device on the basis of the delay thus measured.

The location method can consist, at each transmission of an ultra high frequency signal by the location device:
  of simultaneously transmitting by the location device at least three successive ultrasonic signals, coming from three separate sources, intended for the portable device,
  of measuring a delay between each first time of reception of the ultra high frequency signal and each second time of reception for each ultrasonic signal transmitted by the portable device,
  of determining a position between the portable device and the location device on the basis of the delays thus measured.

The invention also relates to a device for the location of a portable device giving "hands free" access to a vehicle, intended to be installed in the said vehicle, the said portable device communicating with the said location device by ultra high frequency waves, the said location device comprising:
  means of transmission of at least one ultrasonic signal intended for the portable device,
  means of reception of a delay between a first time of reception of the ultra high frequency signal and a second time of reception of the ultrasonic signal by the portable device,
  means of computation of a distance between the portable device and the location device on the basis of the delay thus received.

The invention also relates to a portable device giving "hands free" access to a vehicle, intended to be located by a location device, the said portable device communicating with the said location device by ultra high frequency waves, the said portable device comprising:
  means of reception of an ultrasonic signal,
  means of measuring a delay between a first time of reception of the ultra high frequency signal and a second time of reception of the ultrasonic signal,
  means of transmission of the delay thus measured to the location device.

In a second embodiment of the invention, the location device comprises:
  means of transmission of at least one ultrasonic signal to the portable device,
  means of reception of a distance between the portable device and the location device coming from the portable device.

Moreover, in this second embodiment, the portable device giving "hands free" access to a vehicle, comprises:
  means of reception of an ultrasonic signal,
  means of measuring a delay between a first time of reception of the ultra high frequency signal and un second time of reception of the ultrasonic signal by the portable device,
  means of computation of a distance between the portable device and the location device on the basis of the delay thus computed,
  means of transmission of the said distance to the location device.

The invention also applies to any "hands free" access system comprising a location device and a portable device according to the characteristics listed above, for the first or second embodiment.

Finally, the invention relates to any motor vehicle comprising a location device according to one of the characteristics listed above.

BRIEF DESCRIPTION OF THE DRAWINGS

Other features and advantages of the invention will become apparent on reading the following description and on examining the appended drawings in which.

DETAILED DESCRIPTION OF THE INVENTION

Figure 1:
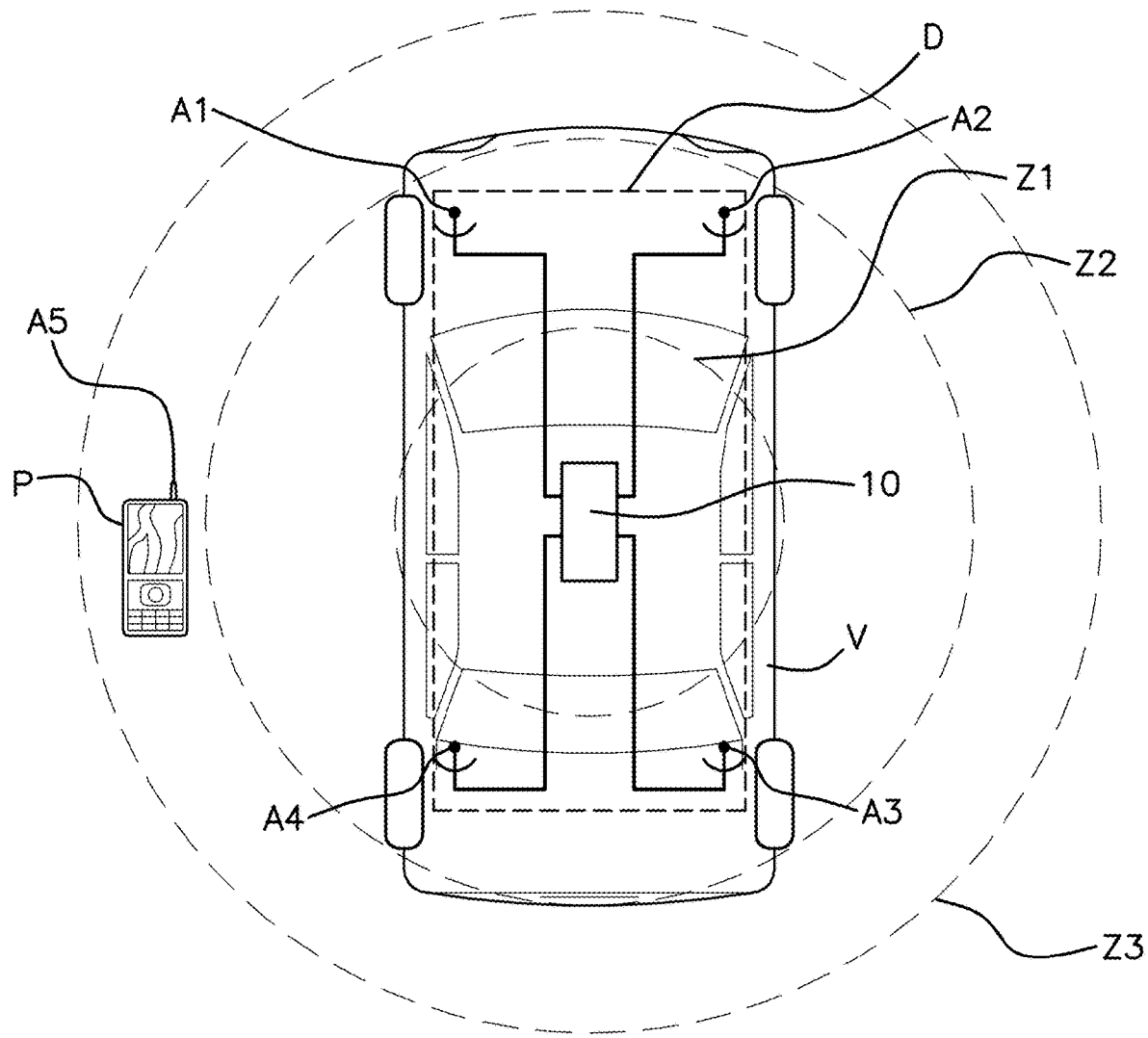
FIG. 1, is a diagrammatic representation of the location device D equipping a motor vehicle V, of the prior art.

FIG. 1 shows a motor vehicle V equipped with a device D for the location of a portable device P giving "hands free" access to the said vehicle V according to the prior art.

The location device D of the prior art comprises four radiofrequency antennas A1, A2, A3, A4 connected to a control unit 10.

The portable device P of the prior art comprises means of transmission/reception of radiofrequency RF, LF waves, in this case an antenna A5 (cf. FIG. 1) in order to communicate with the location device D.

As explained above, the method for location of the portable device P of the prior art, based solely on the measurement of the strength of the radiofrequency signal (RSSI measurement) which the portable device P receives from the location device D is no longer applicable when the location device D and the portable device P communicate by ultra high frequency waves, notably by Bluetooth®.

In fact, the method for determining the position of the portable device P of the prior art does not make it possible to determine the position of the portable device P accurately, the RSSI measurements in Bluetooth® being subject to interference by electromagnetic waves.

The invention proposes a location device D' (cf. FIG. 3) as well as a portable device P' (cf. FIG. 4) communicating by ultra high frequency waves or signals, and allowing the precise location of the portable device P' with respect to the location device D'.

Figure 3:
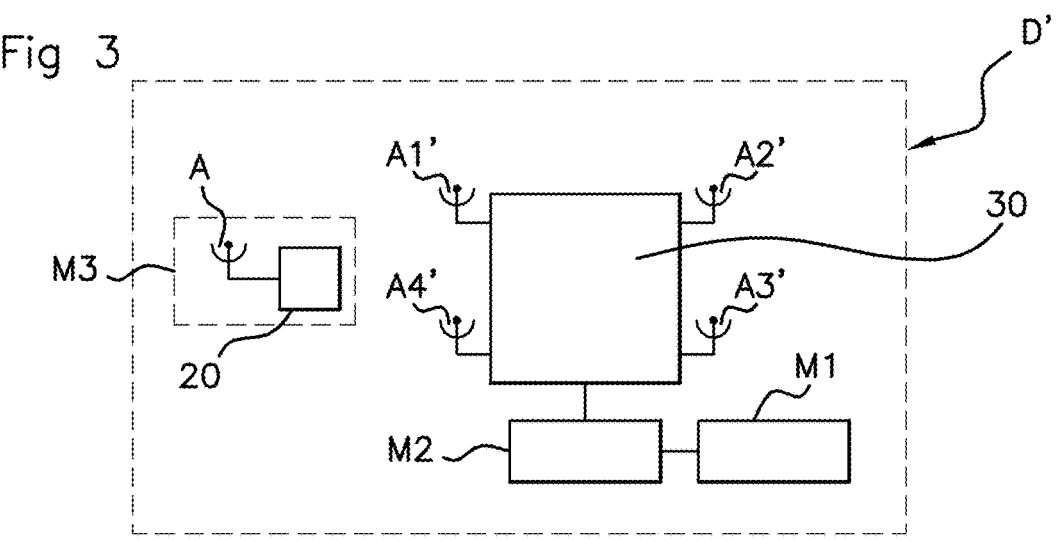
FIG. 3, is a diagrammatic representation of the location device D' according to the invention.

According to the invention, the location device D', shown in FIG. 3, comprises at least one ultra high frequency communication antenna A1', as well as an associated ultra high frequency transmission/reception circuit 30.

In the example shown in FIG. 3, are shown four communication antennas A1', A2', A3' and A4' connected to the ultra high frequency transmission/reception circuit 30.

The location device D' (cf. FIG. 3) comprises moreover:
means of transmission M3 of at least one ultrasonic signal to the portable device P', in the form of an ultrasonic antenna A and an associated ultrasonic transmission/reception circuit 20,
means of reception M2 of a transit time of the ultrasonic signal,
means of computation M1, of a distance between the portable device P' and the location device D' on the basis of the transit time of the ultrasonic signal.

The means of transmission M3 of an ultrasonic signal can consist of audio means installed on the vehicle, such as the reversing radar, the car radio, the horn.

The means of reception M2 of a transit time are, for example, ultra high frequency means of reception M2 and are connected to at least one ultra high frequency communication antenna A1' as well as to the ultra high frequency transmission/reception circuit 30.

The computation means M1 consist of software means.

Figure 4:
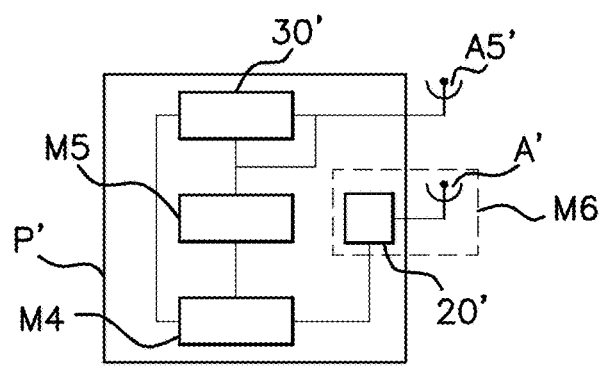
FIG. 4 is a diagrammatic representation of the portable device P' according to the invention.

With regard to the portable device P', shown in FIG. 4, this comprises means of reception of ultra high frequency signals in the form of an ultra high frequency antenna A5' and an associated ultra high frequency transmission/reception circuit 30'.

The portable device P' (cf. FIG. 4) comprises moreover:
means of reception M6 of an ultrasonic signal, in the form of an antenna A' and an associated ultrasonic waves transmission/reception circuit 20',
means of measuring M4 a delay between the reception of an ultra high frequency signal and the reception of the ultrasonic signal, called the "transit time" of the ultrasonic signal,
means of transmission M5 of the said "transit time" to the location device D',
a timestamp device, of the electronic clock type, The means of reception M6 of the ultrasonic signal can be for example a microphone integrated in the portable device P' and its associated electronic control circuit.

The means of measuring M4 the transit time are software means which compute a delay $\Delta t$ between the reception of the ultra high frequency signal and the reception of the ultrasonic signal. The reception of each signal (ultrasonic and ultra high frequency) is timestamped by an electronic clock comprised in the integrated circuit of the portable device P' and thus a delay $\Delta t$ between the reception of the two signals can be computed.

The means of transmission M5 of the transit time consist, for example of ultra high frequency transmission means M5 connected to the ultra high frequency antenna A5'.

Figure 5:
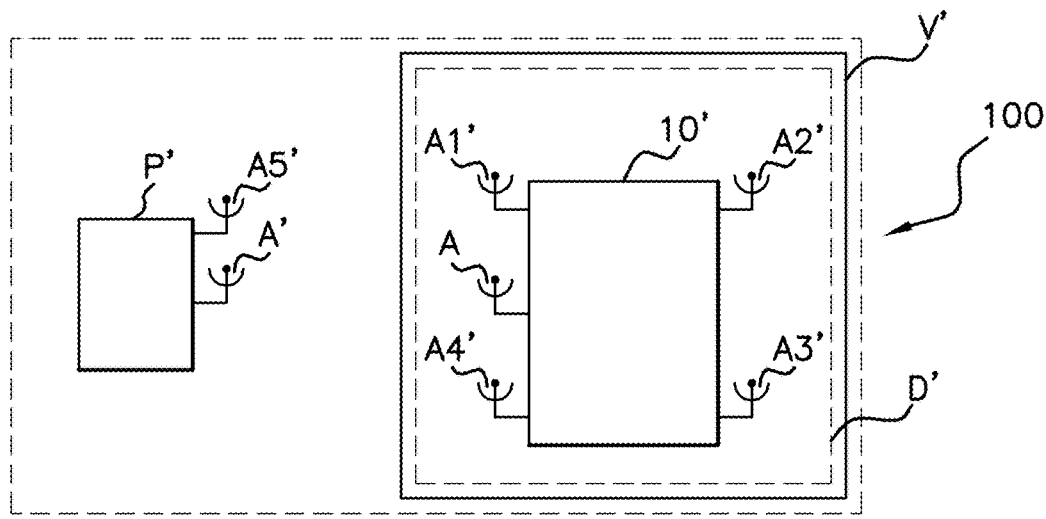
FIG. 5 shows a hands free access system 100 according to the invention.

FIG. 5 shows the location system 100 constituted by the location device D' installed in the vehicle V' and the portable device P' according to the invention.

In an alternative embodiment of the invention (not shown in FIGS. 3 and 4), the location device D' comprises, instead of the means of reception M2 of a transit time of the ultrasonic signal, means of reception of the distance d between the portable device P' and the location device D' sent by the portable device P'.

In this embodiment of the invention, the portable device P' comprises means of computation (not shown) of the distance d, on the basis of the transit time and comprises, instead of the means of transmission M5 of the said transit time to the location device D', means of transmission of the said distance d (not shown) to the location device D'.

Figure 2:
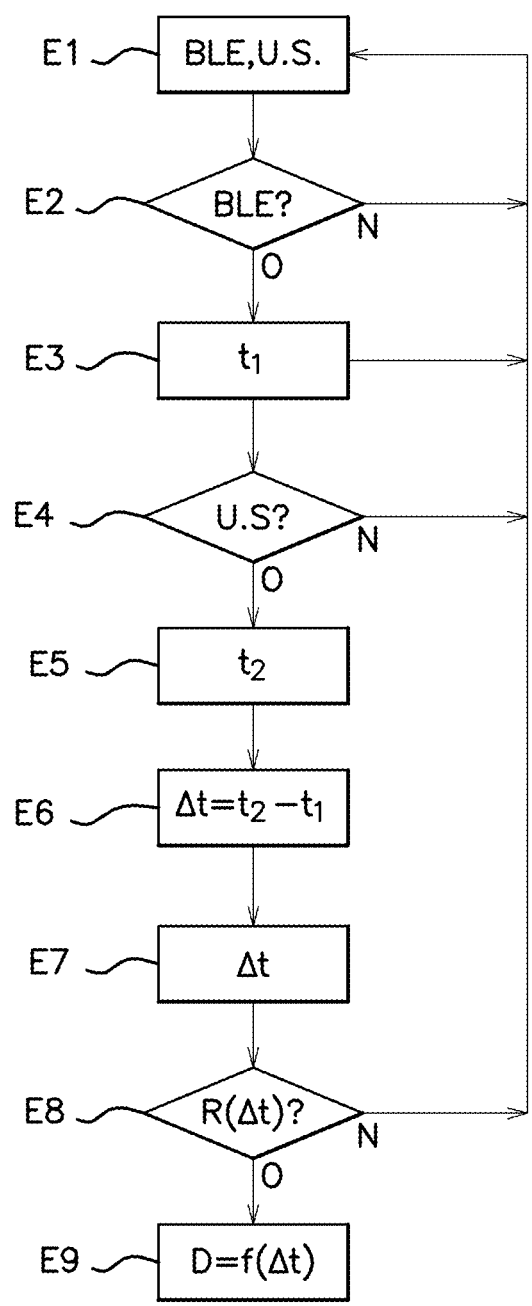
FIG. 2 is a flowchart showing the location method according to the invention.

The location method, shown in FIG. 2, will now be explained.

During a first step, (E1), the location device 10' transmits an ultra high frequency signal to the portable device P'.

This transmission can be carried out periodically, the purpose being to detect the presence of a portable device P' around the V'. In fact, if the portable device P' is in the reception zone of the ultra high frequency signal, it responds in its turn by transmitting an ultra high frequency presence signal to the location device D'.

The invention proposes moreover that, simultaneously with this ultra high frequency transmission, the location device D' also transmits (step E1) an ultrasonic signal to the portable device P'.

This ultrasonic signal, which therefore has a frequency which is situated in the ultrasonic frequency band, can be transmitted by the radio, the horn or any acoustic device installed in the vehicle V.

In a second step (E2), if the ultra high frequency signal has been received by the portable device P', then the said portable device P' stores a first time t1 of reception of the said signal or, in other words, the portable device P', thanks to its internal clock, timestamps (step E3) the time of reception of the ultra high frequency signal.

If the ultra high frequency signal is not received by the portable device P', the location method returns to the first step E1.

Given the difference between the propagation speeds of ultra high frequency waves and ultrasonic waves, the ultra high frequency signal is received chronologically first (if the portable device P' is in the reception zone of the said waves) by the portable device P' and then it is followed by the ultrasonic signal which arrives afterwards and is received successively by the portable device P'.

If the ultrasonic signal is received by the portable device P' (step E4), then the portable device P' similarly stores the second time t2 of reception of the said signal (step E5). In other words, the portable device P', thanks to its internal clock, timestamps (step E5) the time of reception of the ultrasonic signal.

If the ultrasonic signal is not received by the portable device P', the location method returns to the first step E1.

The portable device P' then computes a delay (step E6) between the second time t2 of reception of the ultrasonic signal and the first time of reception t1 of the ultra high frequency signal, called the "transit time" of the ultrasonic signal, that is to say:

$$\Delta t = t2 - t1$$

The portable device P' then sends this transit time Δt to the location device D' (step E7).

If the location device 10' receives the said transit time Δt, (step E8), then it deduces the distance d between the portable device P' and the location device D' from it, by means of the following formula:

$$d = (\Delta t) \times v$$

where:

d is the distance between the portable device P' and the location device D',

Δt is the transit time of the ultrasonic wave, v is the speed of sound (340 m/s).

If the location device D' does not receive the said transit time Δt, the location method restarts at step E1.

The invention judiciously uses the fact that the propagation speed of ultra high frequency waves is much higher than the propagation speed of ultrasonic waves.

In fact, the propagation speed of ultra high frequency waves, for example Bluetooth®, is equal to $v'=3\times10^8$ m/s, whereas the propagation speed of ultrasonic waves, v, is equal to v=340 m/s.

The transit time of the ultra high frequency signal from the location device D' to the portable device P' is therefore much shorter than the transit time of the ultrasonic signal, and the location method according to the invention proposes to ignore this transit time of the ultra high frequency signal in comparison with the transit time of the ultrasonic signals from the location device D' to the portable device P'. By ignoring the transit time of the ultra high frequency signal, a synchronization is achieved between the location device D' and the portable device P' without any in the portable device P' being necessary.

The location method according to the invention is therefore based on the assumption that the ultra high frequency signal is received by the portable device P' at the time it is transmitted by the location device D'.

Since the ultrasonic signal is transmitted simultaneously with the ultra high frequency signal, the timestamped reception of the ultra high frequency signal is considered by the portable device P' as the start of the transmission of the ultrasonic signal by the location device D'.

By computing the difference between the second time of reception t2 of the ultrasonic signal and the first time of reception t1 of the ultra high frequency signal, called the "transit time", that is to say Δt=t2−t1, this is judiciously equivalent, according to the invention, to computing the transit time of the ultrasonic signal between the location device D' and the portable device P'. The distance d separating the two devices can then be computed according to the formula $$d = (\Delta t) \times v$$

where:

d is the distance between the portable device P' and the location device D',

Δt is the transit time of the ultrasonic wave, v is the speed of sound (340 m/s).

The duration of the transit time of the ultrasonic signal therefore makes it possible to determine the distance d separating the location device D' from the portable device P'.

In an alternative embodiment, the portable device P' returns the distance d, computed from the measured transit time according to the equations given above, directly to the location device D'.

It is also possible in a second embodiment, to determine the position du portable device P' with respect to the vehicle V' with more precision and not only the distance d.

For this purpose, the location device D' comprises at least three means of transmission of ultrasonic signals, offset in space. In other words, the means of transmission of ultrasonic signals consist of three different sources of signals situated at different places on the vehicle V'.

The three means of transmission each in their turn sequentially transmit an ultrasonic signal, simultaneously with the transmission of three ultra high frequency signals by the transmission means M2. The portable device P' receives three ultra high frequency signals and then three ultrasonic signals successively. By computing the transit time between the first time of reception of each ultra high frequency signal and the second time of reception of each corresponding ultrasonic signal, it is possible by triangulation to determine with precision the lateral and longitudinal position of the portable device P' with respect to the vehicle V'.

The invention therefore judiciously makes it possible, by the use of existing means (microphone integrated in the portable device P', acoustic means installed in the vehicle V') to determine with precision the position around a vehicle V of a portable device P' communicating by Bluetooth®.

The invention claimed is:

1. A method for locating a portable device (P') for "hands free" access to a vehicle (V') via a location device (D') that is installed in the vehicle (V'), comprising:

communicating between the portable device (P') and the location device (D') by transmitting and receiving ultra high frequency signals as ultra high frequency waves, and simultaneously with every transmitting of an ultra high frequency signal by the location device (D') to the portable device (P'), transmitting by the location device (D') one of three successive ultrasonic signals originating respectively from three separate ultrasound sources, each ultra high frequency signal being transmitted simultaneously with an ultrasonic signal of a different one of the three ultrasound sources;

receiving, at the portable device (P'), the ultra high frequency signals and ultrasonic signals transmitted by the location device (D');

measuring, at the portable device (P') and for each ultra high frequency signal received at the portable device (P'), a time delay (Δt) between a first time of reception (t1) of the received ultra high frequency signal and a second time of reception (t2) of a corresponding ultrasonic signal received after reception of said received ultra high frequency signal; and determining a position of the portable device (P') with respect to the location device (D') on the basis of the measured time delay (Δt).

2. A location device (D'), to be installed in a vehicle (V'), for determining a location of a portable device (P') for "hands free" access to the vehicle (V'), the portable device (P') configured to communicate with the location device (D') by ultra high frequency waves, the location device (D') comprising:

means of sequentially transmitting, simultaneously with each one of three ultra high frequency signals, one of three successive ultrasonic signals to the portable device (P');

means of reception (M2) of a delay (Δt) between a first time of reception (t1) of each ultra high frequency signal received by the portable device (P') and a second time of reception (t2) of each ultrasonic signal received by the portable device (P'); and means of computation (M1) of a distance (d) between the portable device (P') and the location device (D') on the basis of the delay (Δt) thus received.

3. A portable device (P') for "hands free" access to a vehicle, configured to operate with a location device (D'), the portable device (P') comprising:

means for communicating with the location device (D') by ultra high frequency waves;

means of reception (M6) of three successive ultrasonic signals;

means of measuring (M4) a delay (Δt) between a first time of reception (t1) of an ultra high frequency signal and a second time of reception (t2) of each ultrasonic signal received at the portable device (P'); and means of transmission (M5) of the delay (Δt) thus measured to the location device (D').

4. A location device (D'), to be installed in a vehicle (V'), for locating a portable device (P') for "hands free" access to the vehicle (V'), the portable device (P') configured to communicate with the location device (D') by ultra high frequency waves, the location device (D') comprising:

means of sequentially transmitting, simultaneously with each one of three ultra high frequency signals, one of three successive ultrasonic signals to the portable device; and means of reception of a distance (d) between the portable device (P') and the location device (D'), coming from the portable device (P').

5. A portable device (P') for "hands free" access to a vehicle, configured for operation with a location device (D'), the said portable device (P') comprising:

means for communicating with the location device (D') by ultra high frequency waves means of reception (M6) of three successive ultrasonic signals;

means of measuring (M4) a delay (Δt) between a first time of reception (t1) of an ultra high frequency signal and a second time of reception (t2) of each ultrasonic signal received by the portable device (P');

means of computation of a distance (d) between the portable device (P') and the location device (D') on the basis of the delay (Δt) thus computed; and means of transmission (M5) of the said distance (d) to the location device (D').

6. "Hands free" access system (100) comprising a location device (D') according to claim 2 and a portable device (P') for "hands free" access to a vehicle, intended to be located by a location device (D'), the portable device (P') communicating with the location device (D') by ultra high frequency waves, the portable device (P') comprising:

means of reception (M6) of three ultrasonic signals;

means of measuring (M4) a delay (Δt) between a first time of reception (t1) of each ultra high frequency signal and a second time of reception (t2) of each ultrasonic signal; and means of transmission (M5) of the delay (Δt) thus measured to the location device (D').

7. "Hands free" access system comprising a location device (D') according to claim 4 and a portable device (P') giving "hands free" access to a vehicle, intended to be located by a location device (D'), the said portable device (P') communicating with the said location device (D') by ultra high frequency waves, the portable device (P') comprising:

means of reception (M6) of three ultrasonic signals;

means of measuring (M4) a delay (Δt) between a first time of reception (t1) of each ultra high frequency signal and a second time of reception (t2) of each ultrasonic signal by the portable device (P');

means of computation of a distance (d) between the portable device (P') and the location device (D') on the basis of the delay (Δt) thus computed; and means of transmission (M5) of the said distance (d) to the location device (D').

8. A motor vehicle (V') comprising a location device (D') according to claim 2.

9. A motor H t r vehicle (V') comprising a location device (D') according to claim 4.

* * * * *